Aug. 24, 1954     A. R. CELLERINI     2,687,462
CIRCUIT INTERRUPTER
Filed Feb. 16, 1950     2 Sheets-Sheet 1

WITNESSES:
E. A. M'Closkey.
W. R. Crout

INVENTOR
Albert R. Cellerini.
BY
Ralph H. Swingle
ATTORNEY

Aug. 24, 1954     A. R. CELLERINI     2,687,462
CIRCUIT INTERRUPTER
Filed Feb. 16, 1950
2 Sheets-Sheet 2
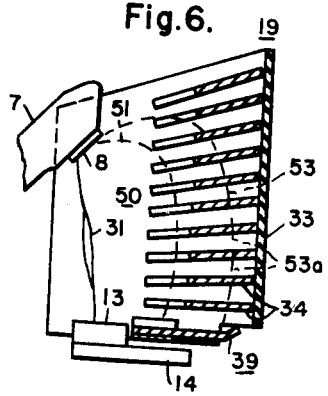
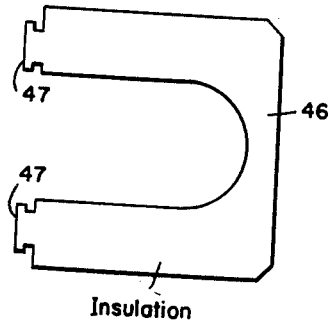
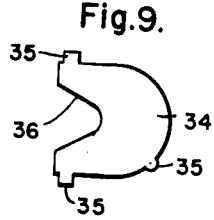
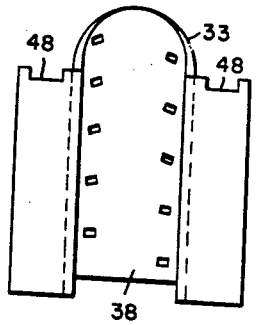
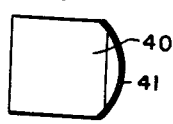
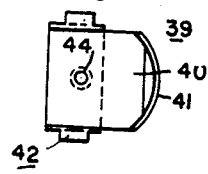
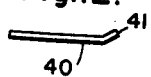
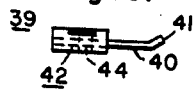
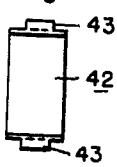
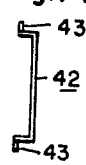
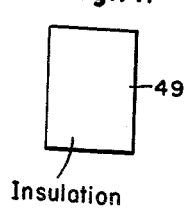
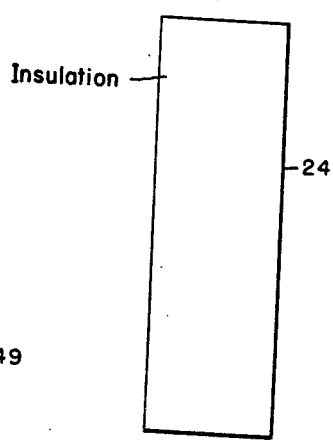
WITNESSES:
INVENTOR
Albert R. Cellerini.
BY
Ralph H. Swingle
ATTORNEY Patented Aug. 24, 1954

2,687,462

UNITED STATES PATENT OFFICE 2,687,462

CIRCUIT INTERRUPTER

Albert R. Cellerini, Beaver, Pa., assignor to Westinghouse Electric Corporation, East Pittsburgh, Pa., a corporation of Pennsylvania Application February 16, 1950, Serial No. 144,461

22 Claims. (Cl. 200—147)

This invention relates generally to circuit interrupters, and more particularly to arc-extinguishing structures for circuit interrupters of the air-break type.

A general object is to provide an improved arc extinguisher of the spaced metallic plate type in which improved means are provided to magnetically force the established arc into the arc chute.

A further object is to provide a very effective and compact arc chute of the spaced metallic plate type, in which high speed lateral movement of the arc into the spaced plates is achieved by more effective magnetic means than has been attained heretofore.

Another object is to provide an improved magnetic structure for a circuit interrupter of the air-break type employing a plurality of spaced metallic plates.

Another object is to provide an improved plate material for an interrupter of the spaced metallic plate type.

Further objects and advantages will readily become apparent upon reading the following specification taken in conjunction with the drawings, in which Figure 1 is a side elevational view, partially in vertical section, of an improved circuit interrupter embodying my invention and shown in the open circuit position;

Fig. 6 is a vertical sectional view through the arc chute, the contacts being shown in the partially open circuit position;

Fig. 7 is a plan view of the pole face;

Fig. 8 is a plan view of a fiber deflector;

Fig. 9 is a plan view of one of the metallic plates of my improved arc chute;

Fig. 10 is a front elevational view of the fiber support;

Fig. 11 is a plan view of an arc plate horn;

Fig. 12 is a side elevational view of the arc plate horn of Fig. 11;

Figs. 13 and 14 are plan and end views of the clamp for the arc plate horn, with Figs. 15 and 16 showing plan and side views of the completed arc plate horn subassembly;

Fig. 17 is a plan view of a fiber deflector, and Fig. 18 is a view of the piece of insulation which is wrapped about each of the legs of the iron yoke before the blowout coils are placed thereabout.

Figure 1:
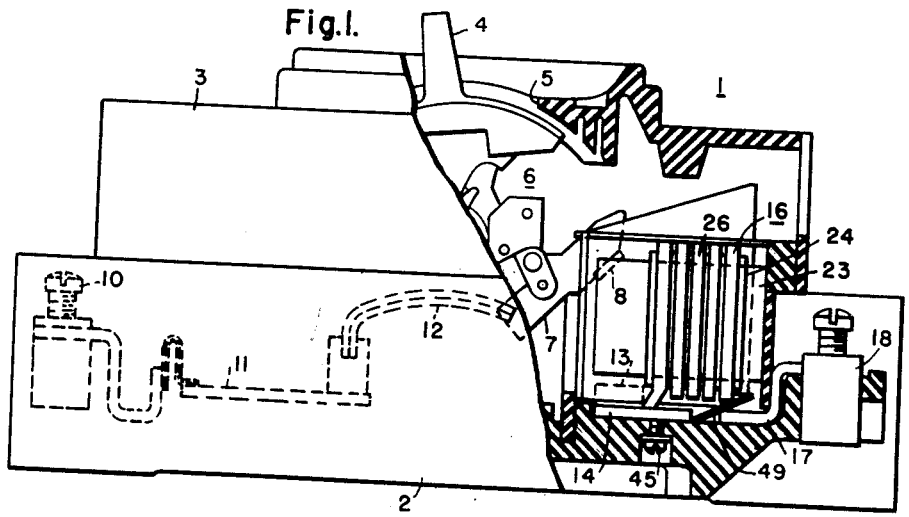

Referring to the drawings, and more particularly to Fig. 1 thereof, the reference numeral 1 designates a circuit interrupter of the air-break type including a molded base 2 and a molded cover 3. A handle or operating arm 4 projects through an opening 5 provided in the cover 3 so that one may externally manually operate the mechanism 6 for actuating the movable contact arm 7, to which the movable contact 8 is affixed.

Although generally the interrupter 1 is of the three-pole type, that is, adapted for controlling a three-phase circuit, for purposes of clarity only a single pole is shown. Obviously the other two poles of a multiphase breaker could be constructed similarly and, as is customarily done, are operated by the same mechanism 6.

A line terminal 10 is provided to carry current through a conductor 11 which is usually associated with a temperature responsive overload device, not shown, which will serve to trip the breaker 1 upon occurrence of excessive current passing therethrough. Since my invention is not concerned with either the actuating mechanism 6, or with any such overload device, a discussion or a picturing of them is omitted. For the purpose of understanding my invention, it is merely necessary to know that the current passing through the connector 11 also passes through a flexible conductor 12 which is spot-welded, or otherwise secured, to the moving contact arm 7.

In the closed-circuit position of the interrupter, not shown, the movable contact 8 engages the stationary contact 13 in abutting engagement and the current passes through the stationary contact 13, through a contact support plate 14 and through a pair of electrically-parallel blowout coils 15, 16 to a conducting strap, or terminal projecting portion 17, to which the line terminal 18 is attached.

Figure 2:
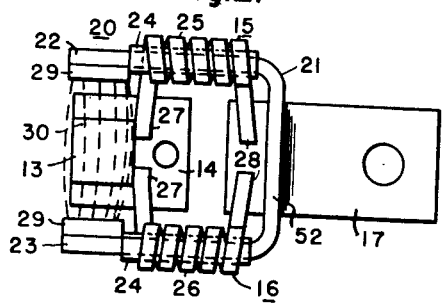
Fig. 2 is a plan view of the magnetic circuit employed in my improved interrupter.
Figure 3:
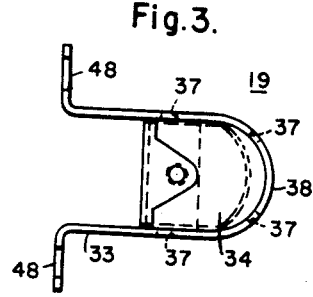
Fig. 3 is a plan view of the arc chute subassembly.
Figure 4:
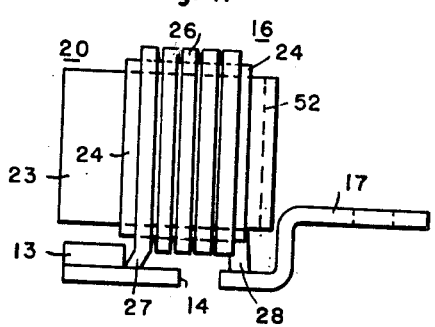
Fig. 4 is a side elevational view of the magnetic structure shown in Fig. 2.
Figure 5:
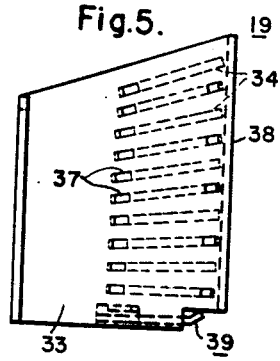
Fig. 5 is a side elevational view of the arc chute subassembly shown in Fig. 3.

My invention is particularly concerned with the arc chute, generally designated by the reference numeral 19 in Figs. 3 and 5, and with the magnetic structure or frame 20 of Figs. 2 and 4.

The magnetic structure 20 includes a U-shaped member of soft iron 21 around the legs 22, 23 of which are wrapped a piece of insulation 24 (Fig. 18) which is preferably composed of any suitable insulating material, such as fish paper.

After the fish paper strips 24 have been wound about the legs 22, 23 of the soft iron yoke 21, blowout windings 25, 26, initially preformed, are slipped over the insulating strips 24 in the manner shown in Figs. 2 and 4. The left-hand ends 27 of the blowout coils 25, 26, as viewed in Fig. 2, are welded to the contact support plate 14. The right-hand ends 28 of the blowout coils 25, 26, as viewed in Fig. 2, are welded to the conducting strap 17. It will, therefore, be evident that the current passing through the interrupter 1 divides at the contact support plate 14 and passes through both blowout coils 25, 26 to the conducting strap 17, and thence to the right-hand line terminal 18 of the interrupter 1.

After the blowout coils 25, 26 have been placed on the legs 22, 23 of the soft iron yoke 21 over the fish paper strips 24, pole faces 29 (Fig. 7) are spot-welded to the extreme lefthand ends of the legs 22, 23 in a manner more fully shown in Fig. 2. Consequently, the energization of the electrically-parallel blowout coils 25, 26 serves to create an intense magnetic field between the pole faces 29, as indicated by the dotted lines 30 of Fig. 2. This magnetic field 30 serves to force the arc 31, which is established between the stationary and movable contacts 13, 8 during the opening operation, toward the right, as viewed in Fig. 6, and into the arc chute 19, more fully described hereinafter.

The arc chute 19 will now be described. The arc chute 19 comprises an arc plate support 33 formed of a suitable gas-evolving insulating plate material, such as fiber, and a plurality of spaced non-magnetic conducting plates 34. The plates 34 are shown more clearly in Fig. 9, and it will be observed that they are provided with integrally formed lugs 35 and a slot 36, the latter extending inwardly from the left-hand side of the plate 34, as viewed in Fig. 9. The lugs 35 of the conducting plates 34 project through apertures 37 stamped in the fiber sheath 33, with the plates 34 staggered in such manner that the right-hand lug 35 is disposed alternately along the front side 38 of the arc plate support 33.

At the lower end of the arc chute 19 is provided an arc plate runner or horn 39, shown more clearly in Figs. 15 and 16, and comprising a conducting plate 40 having its front edge 41 turned up slightly, as shown in Fig. 12. A U-shaped clamp 42 having projecting side lugs 43 fits under the plate 40 and is spot-welded thereto. Following the welding operation an aperture 44 is drilled through the subassembly 39 and is tapped. The tapped aperture 44 accommodates the upper end of a bolt, or screw, 45 which secures both the contact support plate 14 and the arc chute 19 in position. It will be observed that the projections or lugs 43 of the clamp 42 extend through the lower apertures 37 of the arc plate support 33 so that by securing the arcing plate 40 rigidly in position to the base 2 by the bolt 45, correspondingly the arc chute 19 is likewise fixedly secured into its proper position.

The assembled arc chute 19 is placed within the interior of the magnetic structure 20, in a manner more clearly shown in Fig. 1 of the drawings. At the upper end of the arc plate support 33 is placed the deflector 46 (Fig. 8) which has lugs 47 which fit into notches 48 formed with the arc plate support 33. Also a deflector 49 (Fig. 17) is placed below the arc chute 19, as shown in Fig. 1, to deflect the arc gases away from the conducting strap 17.

The manner of operation of my improved arc extinguisher will now be explained. In response to manual operation of the handle 4, or in response to tripping of an overload device associated with the interrupter 1, the mechanism 6 is actuated to cause an upward separating motion of the movable contact arm 7 and movable contact 8 away from the stationary contact 13 to establish an arc 31 therebetween. Since the arc 31 is initially established within an intense transverse magnetic field 30, as set up by the series blowout coils 25, 26 through the soft iron yoke 21, the arc 31 will be forced toward the right, as viewed in Fig. 6, and into the spaced conducting plates 34 of the arc chute 19. The several notches or slots 36 of the plates 34 align, as shown in Fig. 6, to form an arc passage 50, within which the arc 31 is magnetically forced.

The arc 31 is bowed toward the right, as shown by the dotted line 51 of Fig. 6, and the lower end thereof quickly transfers to the arc plate horn 39. Also the arc 51 is attracted by the bight portion 52 (Fig. 2) of the soft iron yoke 21 to cause it to transfer to the plates 34 and become subdivided thereby. The arc then assumes the position 53 of Fig. 6, and it rapidly moves across the plates 34 to the right, until it strikes the gas-evolving front edge 38 of the fiber sheath or arc plate support 33.

The arc 53, in coming into contact with the fiber gas evolving sheath 33, will cause the evolution of gas therefrom, which will pass toward the left, as viewed in Fig. 6 and back through the arc stream, thereby deionizing the arc 53. Although the evolved gas tends to force the arc 53 toward the left, as viewed in Fig. 6, and back out of the spaced plate structure, nevertheless the intense magnetic field 30 acts in the opposite direction. As a result, the arc 53 is subjected to two opposing forces, one the force of the gas pressure from the evolved gas, and the other the magnetic force as exerted by the magnetic field 30. The net result is a rapid oscillating movement of the arc terminals upon the surfaces of the several conducting plates 34 to bring about rapid arc extinction. The rapid movement of the arc saves the plates from excessive heating in spots and prevents burning of holes through the plates.

It will be noted that I have used non-magnetic plates 34 which do not affect the magnetic field 30, and yet provide conducting surfaces for the arc sections 53a to move. Preferably the plates 34 are formed of a suitable alloy, such as nickel and chromium alloyed together in a proper proportion, such as about 80% nickel and about 20% chromium. Such a non-magnetic alloy does not disturb the magnetic flux field and yet is a good conductor and resists arc burning.

By having the arc plate support 33 formed of a gas-evolving material, such as fiber, there results considerable evolution of gas upon the contact of the arc 53 therewith. Since the gas must escape through the arc stream itself there is considerable turbulence set up, and the arc 53 is quickly extinguished.

My improved arc extinguisher is particularly suitable for the interruption of direct currents, but its use is not exclusively applicable thereto. It will be observed that the arc chute 19 may easily be removed from the base 2 by removing the screw 45. It will also be observed that the rightward biasing force exerted upon the arc results from the cumulative effect of both the magnetic field 30 and also by the presence of the bight portion 52 of the yoke 21. The bight portion 52 provides a low reluctance path for the magnetic field surrounding the arc 31 and distorts this field to cause rapid rightward movement of the arc 31 into the spaced non-magnetic conducting plates 34. During the interruption of low currents the arc 31 is actuated mainly by its force of attraction to the iron bight portion 52.

In being forced far back into the arc chute 19, the arc is more effectively split up into smaller arcs than if it hung onto the throat of the plates 34. It is a well known fact that the arc can be cooled and therefore deionized more quickly and efficiently when it is split up into small arcs reasonably well isolated from each other. Also the arc is stretched a little more than usual by forcing it back into the arc chute 19.

It will be observed that the arc chute 19 is relatively narrow and thus the arc is restricted instead of spread out. This increases the arc resistance which is very desirable in quenching arcs, especially direct current arcs.

It is to be noted that with the foregoing construction of the arc chute 19 most of the gases are formed at the back of the arc chute and very little are formed at the side of the arc chute, because the arc is held toward the back of the arc chute by the magnetic field. Therefore, the fiber at the back of the arc chute is heated much more than at the sides thereof.

Although I have shown and described a specific structure, it is to be clearly understood that the same was merely for the purpose of illustration, and that changes and modifications may readily be made therein, by those skilled in the art, without departing from the spirit and scope of the appended claims.

I claim as my invention:

1. A circuit interrupter including a plurality of non-magnetic spaced metallic plates, means for establishing an arc, magnetic means including a U-shaped member of magnetic material outside of the plates and partially surrounding the same for moving the established arc laterally into the spaced metallic plates to become subdivided thereby, the bight portion of the U-shaped member of magnetic material being positioned at the ends of the spaced plates opposite the means for establishing the arc, and a plate support member composed of gas-evolving material to support the plates in spaced relationship, the arc engaging the gas-evolving plate support member to evolve gas to assist in the extinction of the arc.

2. A circuit interrupter including an arc chute comprising a substantially U-shaped support member composed of gas-evolving material and supporting a plurality of non-magnetic conducting plates in spaced relationship, contact means for establishing an arc, a U-shaped magnetic yoke member partially surrounding the arc chute, the bight portion of the U-shaped magnetic yoke member being positioned at the ends of the spaced plates opposite the contact means for establishing the arc, an energizing coil wound about the yoke member and connected electrically in series with the contact means, the arc moving into engagement with the spaced conducting plates to become subdivided thereby, and the arc evolving gas from the gas-evolving support member to assist in deionizing the arc.

3. A circuit interrupter including an arc chute comprising a substantially U-shaped support member composed of gas-evolving material and supporting a plurality of non-magnetic conducting plates in spaced relationship, contact means for establishing an arc, a U-shaped magnetic yoke member partially surrounding the arc chute, a pair of electrically parallel energizing coils wound about the legs of the yoke member and connected electrically in series with the contact means, the bight portion of the U-shaped magnetic yoke member being positioned at the ends of the spaced plates opposite the contact means for establishing the arc so that the arc moves toward the bight portion of the yoke member into engagement with the spaced conducting plates to become subdivided thereby, and the arc evolving gas from the gas-evolving support member to assist in deionizing the arc.

4. A circuit interrupter including a U-shaped yoke member composed of magnetic material, a plurality of spaced conducting non-magnetic plates disposed between the legs of the yoke member and adjacent the bight portion thereof, means for establishing an arc, and the bight portion of the U-shaped yoke member being positioned at the ends of the spaced plates opposite the arc-establishing means so that the arc moves toward the bight portion into engagement with the plates to become subdivided thereby.

5. A circuit interrupter including a U-shaped yoke member composed of magnetic material, an energizing winding wound about the yoke member, a plurality of spaced conducting non-magnetic plates disposed between the legs of the yoke member and adjacent the bight portion thereof, means for establishing an arc, and the bight portion of the U-shaped yoke member being positioned at the ends of the spaced plates opposite the arc-establishing means so that the arc moves toward the bight portion into engagement with the plates to become subdivided thereby.

6. A circuit interrupter including a U-shaped yoke member composed of magnetic material, an energizing winding wound about the yoke member and electrically connected in series circuit, a plurality of spaced conducting non-magnetic plates disposed between the legs of the yoke member and adjacent the bight portion thereof, means for establishing an arc, and the bight portion of the U-shaped yoke member being positioned at the ends of the spaced plates opposite the arc-establishing means so that the arc moves toward the bight portion into engagement with the plates to become subdivided thereby.

7. A circuit interrupter including means for establishing an arc, an arc chute including a plurality of spaced non-magnetic conducting plates of a nickel-chromium alloy, and the arc moving into the plates to become subdivided thereby to effect the extinction thereof.

8. A circuit interrupter including means for establishing an arc, an arc chute including a plurality of spaced non-magnetic conducting plates, a pair of pole plates disposed on opposite sides of the arc chute, a magnetic frame for moving the arc magnetically interconnecting the pole plates, the bight portion of the magnetic frame being positioned at the ends of the spaced plates opposite the means for establishing the arc, an energizing winding about the magnetic frame to set up a magnetic field between the pole plates and transversely of the spaced non-magnetic plates to effect movement of the arc thereon toward the bight portion of the frame, and the magnetic field being undisturbed by the non-magnetic plates.

9. A circuit interrupter including a plurality of non-magnetic spaced metallic plates, means for establishing an arc, magnetic means for moving the established arc laterally into the spaced metallic plates to become subdivided thereby, the magnetic means including a U-shaped magnetic frame with the bight portion thereof being positioned at the ends of the spaced plates opposite the means for establishing the arc, the frame at least partially surrounding the spaced non-magnetic metallic plates, and the serially related subdivided arcs between the plates moving thereon to become extinguished.

10. A circuit interrupter including a plurality of non-magnetic spaced metallic plates, means for establishing an arc, magnetic means for moving the established arc laterally into the spaced metallic plates to become subdivided thereby, the magnetic means including a U-shaped magnetic frame at least partially surrounding the spaced non-magnetic metallic plates, the bight portion of the U-shaped magnetic frame being positioned at the ends of the spaced plates opposite the means for establishing the arc, one or more blowout coils wound about the magnetic frame to create magnetic flux in the arc space to effect lateral motion of the arc, and the serially related subdivided arcs between the plates moving thereon to become extinguished.

11. A circuit interrupter including an arc chute having a substantially U-shaped support member composed of gas-evolving material and supporting a plurality of non-magnetic conducting plates of a nickel-chromium alloy in spaced relationship, contact means for establishing an arc, a U-shaped magnetic yoke member partially surrounding the arc chute, a pair of electrically parallel energizing coils wound about the legs of the yoke member and connected electrically in series with the contact means, the bight portion of the U-shaped magnetic yoke member being positioned at the ends of the spaced plates opposite the contact means for establishing the arc so that the arc moves toward the bight portion of the yoke member into engagement with the spaced conducting plates to become subdivided thereby, and the arc evolving gas from the gas-evolving support member to assist in deionizing the arc.

12. A circuit interrupter including a plurality of non-magnetic spaced metallic plates of a nickel-chromium alloy, means for establishing an arc, magnetic means including a U-shaped member of magnetic material outside of the plates and partially surrounding the same for moving the established arc laterally into the spaced metallic plates to become subdivided thereby, the bight portion of the U-shaped member of magnetic material being positioned at the ends of the spaced plates opposite the means for establishing the arc, and a plate support member composed of gas-evolving material to support the plates in spaced relationship, the arc engaging the gas-evolving plate support member to evolve gas to assist in the extinction of the arc.

13. A circuit interrupter including an arc chute comprising a substantially U-shaped support member composed of gas-evolving material and supporting a plurality of non-magnetic conducting plates of a nickel-chromium alloy in spaced relationship, contact means for establishing an arc, a U-shaped magnetic yoke member partially surrounding the arc chute, the bight portion of the U-shaped magnetic yoke member being positioned at the ends of the spaced plates opposite the contact means for establishing the arc, an energizing coil wound about the yoke member and connected electrically in series with the contact means, the arc moving into engagement with the spaced conducting plates to become subdivided thereby, and the arc evolving gas from the gas-evolving support member to assist in deionizing the arc.

14. A circuit interrupter including an arc chute comprising a substantially U-shaped support member composed of gas-evolving material and supporting a plurality of non-magnetic conducting plates of a nickel-chromium alloy in spaced relationship, contact means for establishing an arc, a U-shaped magnetic yoke member partially surrounding the arc chute, a pair of electrically parallel energizing coils wound about the legs of the yoke member and connected electrically in series with the contact means, the bight portion of the U-shaped magnetic yoke member being positioned at the ends of the spaced plates opposite the contact means for establishing the arc so that the arc moves toward the bight portion of the yoke member into engagement with the spaced conducting plates to become subdivided thereby, and the arc evolving gas from the gas-evolving support member to assist in deionizing the arc.

15. A circuit interrupter including a U-shaped yoke member composed of magnetic material, a plurality of spaced conducting non-magnetic plates of a nickel-chromium alloy disposed between the legs of the yoke member and adjacent the bight portion thereof, means for establishing an arc, and the bight portion of the U-shaped yoke member being positioned at the ends of the yoke member being positioned at the ends of the spaced plates opposite the arc-establishing means so that the arc moves toward the bight portion into engagement with the plates to become subdivided thereby.

16. A circuit interrupter including a U-shaped yoke member composed of magnetic material, an energizing winding wound about the yoke member, a plurality of spaced conducting non-magnetic plates of a nickel-chromium alloy disposed between the legs of the yoke member and adjacent the bight portion thereof, means for establishing an arc, and the bight portion of the U-shaped yoke member being positioned at the ends of the spaced plates opposite the arc-establishing means so that the arc moves toward the bight portion into engagement with the plates to become subdivided thereby.

17. A circuit interrupter including a U-shaped yoke member composed of magnetic material, an energizing winding wound about the yoke member and electrically connected in series circuit, a plurality of spaced conducting non-magnetic plates of a nickel-chromium alloy disposed between the legs of the yoke member and adjacent the bight portion thereof, means for establishing an arc, and the bight portion of the U-shaped yoke member being positioned at the ends of the spaced plates opposite the arc-establishing means so that the arc moves toward the bight portion into engagement with the plates to become subdivided thereby.

18. A circuit interrupter including means for establishing an arc, an arc chute including a plurality of spaced non-magnetic conducting plates of a nickel-chromium alloy, a pair of pole plates disposed on opposite sides of the arc chute, a magnetic frame for moving the arc magnetically interconnecting the pole plates, the bight portion of the magnetic frame being positioned at the ends of the spaced plates opposite the means for establishing the arc, an energizing winding about the magnetic frame to set up a magnetic field between the pole plates and transversely of the spaced non-magnetic plates to effect movement of the arc thereon toward the bight portion of the frame, and the magnetic field being undisturbed by the non-magnetic plates.

19. A circuit interrupter including a plurality of non-magnetic spaced metallic plates of a nickel-chromium alloy, means for establishing an arc, magnetic means for moving the established arc laterally into the spaced metallic plates to become subdivided thereby, the magnetic means including a U-shaped magnetic frame with the bight portion thereof being positioned at the ends of the spaced plates opposite the means for establishing the arc, the frame at least partially surrounding the spaced non-magnetic metallic plates, and the serially related subdivided arcs between the plates moving thereon to become extinguished.

20. A circuit interrupter including a plurality of non-magnetic spaced metallic plates of a nickel-chromium alloy, means for establishing an arc, magnetic means for moving the established arc laterally into the spaced metallic plates to become subdivided thereby, the magnetic means including a U-shaped magnetic frame at least partially surrounding the spaced non-magnetic metallic plates, the bight portion of the U-shaped magnetic frame being positioned at the ends of the spaced plates opposite the means for establishing the arc, one or more blowout coils wound about the magnetic frame to create magnetic flux in the arc space to effect lateral motion of the arc, and the serially related subdivided arcs between the plates moving thereon to become extinguished.

21. A circuit interrupter including means for establishing an arc and an arc chute for extinguishing the same, said arc-establishing means including a relatively stationary contact portion, a terminal projecting portion, a pair of blowout coils connected directly between the relatively stationary contact portion and the terminal projecting portion in electrical parallel, a U-shaped member of magnetic material extending through the pair of blowout coils so that a blowout coil is completely about each leg thereof, the arc chute being positioned between the two blowout coils, and the arc-establishing means drawing the arc in a direction substantially parallel to the bight portion of the U-shaped member of magnetic material so that the arc will be moved toward the bight portion.

22. A circuit interrupter including means for establishing an arc and an arc chute for extinguishing the same, said arc-establishing means including a relatively stationary contact portion, a terminal projecting portion, a pair of blowout coils connected directly between the relatively stationary contact portion and the terminal projecting portion in electrical parallel, a U-shaped member of magnetic material extending through the pair of blowout coils so that a blowout coil is completely about each leg thereof, the arc chute being positioned between the two blowout coils, said arc chute including a plurality of spaced conducting plates, and the arc-establishing means drawing the arc in a direction substantially parallel to the bight portion of the U-shaped member of magnetic material so that the arc will be moved toward the bight portion.

References Cited in the file of this patent

UNITED STATES PATENTS

| Number | Name | Date |
|---|---|---|
| 1,758,752 | Kuhn | May 13, 1930 |
| 2,047,302 | Xardell | July 14, 1936 |
| 2,133,158 | Ver Planck et al. | Oct. 11, 1938 |
| 2,236,580 | Sandin et al. | Apr. 1, 1941 |
| 2,240,623 | Lindstrom | May 6, 1941 |
| 2,255,886 | Hudson | Sept. 16, 1941 |
| 2,268,336 | Jackson et al. | Dec. 30, 1941 |
| 2,352,984 | Walle | July 4, 1944 |
| 2,363,606 | Maseng | Nov. 28, 1944 |
| 2,419,125 | Dorfman et al. | Apr. 15, 1947 |

FOREIGN PATENTS

| Number | Country | Date |
|---|---|---|
| 219,723 | Great Britain | Aug. 5, 1924 |